(12) United States Patent
Frohnmayer et al.

(10) Patent No.: US 8,985,255 B2
(45) Date of Patent: Mar. 24, 2015

(54) NARROW BODY ULTRA EFFICIENT THREE WHEELED ELECTRIC VEHICLE WITH AUTOMOTIVE CLASS FEEL

(75) Inventors: Mark Douglas Frohnmayer, Eugene, OR (US); Thomas Hynes Mohler, Eugene, OR (US); Christopher George Angot, Cottage Grove, OR (US); James K. Jordan, Junction City, OR (US); Landon Chappell, Eugene, OR (US); Ames Jacoby, Eugene, OR (US); Larry William Milligan, Eugene, OR (US)

(73) Assignee: Arcimoto, Inc., Eugene, OR (US)

( * ) Notice: Subject to any disclaimer, the term of this patent is extended or adjusted under 35 U.S.C. 154(b) by 0 days.

(21) Appl. No.: 13/204,364

(22) Filed: Aug. 5, 2011

(65) Prior Publication Data

US 2012/0037441 A1 Feb. 16, 2012

Related U.S. Application Data

(60) Provisional application No. 61/372,415, filed on Aug. 10, 2010.

(51) Int. Cl.
| | |
|---|---|
| *B62D 61/06* | (2006.01) |
| *B62K 5/05* | (2013.01) |
| *B62D 21/08* | (2006.01) |
| *B60L 11/18* | (2006.01) |
| *B62D 31/00* | (2006.01) |

(52) U.S. Cl.
CPC .............. *B62D 21/08* (2013.01); *B60L 11/1805* (2013.01); *B60L 11/1877* (2013.01); *B62D 31/003* (2013.01); *B62D 61/065* (2013.01); *B60L 2200/22* (2013.01); *Y02T 10/7005* (2013.01); *Y02T 10/705* (2013.01)

USPC ............ 180/216; 180/211; 180/60; 180/291; 280/62

(58) Field of Classification Search
USPC ......... 180/216, 212, 213, 214, 210, 211, 215, 180/217, 60, 206.1, 65.1, 65.51, 65.6, 65.7, 180/69.1, 291, 292, 90.6; 280/62; 701/22; 903/903; 318/139
IPC ... B62D 61/06,25/20; B62K 5/02; B60L 11/18; B60K 1/00, 7/00
See application file for complete search history.

(56) References Cited

U.S. PATENT DOCUMENTS

| | | | | | |
|---|---|---|---|---|---|
| 4,606,429 | A | * | 8/1986 | Kurata | 180/292 |
| 4,625,825 | A | * | 12/1986 | Ethier | 180/24 |
| 4,662,468 | A | * | 5/1987 | Ethier | 180/215 |
| 5,431,243 | A | * | 7/1995 | Richards | 180/211 |
| 8,061,465 | B2 | * | 11/2011 | Martino | 180/210 |
| 2008/0238140 | A1 | * | 10/2008 | Kejha | 296/181.1 |

* cited by examiner

*Primary Examiner* — Keith Frisby

(57) ABSTRACT

A three wheel electric vehicle platform with two wheels in front and one wheel at the rear, a full safety roll cage, a propulsion and steering system operating through the two front wheels, and operator's and passenger's seats mounted in-line along the vehicle centerline. The propulsion system is an electric motor powered by an energy storage device driving a speed reduction and differential with dual outputs suitable for two wheel front drive. The operator's seat is narrower in parts than a conventional automotive seat such that the rear seat passenger's knees can comfortably straddle the operator seat to allow the distance between the two occupants to be less than a typical automobile. The driver's and passenger's heels comfortably fit into recessed wells within the energy storage device, thus allowing the driver's and passenger's center of gravity to be lower, while still maintaining a comfortable sitting position.

16 Claims, 3 Drawing Sheets

NARROW BODY ULTRA EFFICIENT THREE WHEELED ELECTRIC VEHICLE WITH AUTOMOTIVE CLASS FEEL

CROSS-REFERENCE TO RELATED APPLICATIONS

This application claims the benefit of U.S. Provisional Application No. 61/372,415 filed Aug. 10, 2010 titled "Narrow body ultra efficient three wheeled electric vehicle with automotive class feel"

BACKGROUND

1. Field

This invention concerns an ultra efficient vehicle, particularly a three-wheeled electric vehicle suitable for transporting one or two occupants.

2. General Discussion of the Background

There has been increasing demand in recent years for ultra efficient vehicles that carry a lesser energy and environmental footprint than traditional automobiles. Increasing adoption of hybrid vehicles featuring increased fuel efficiency is an example of this trend. Although there is a latent market demand for additional efficiency gains brought by adopting more efficient power systems, such as a battery electric drive, or more energy efficient form factors, such as two or three-wheeled vehicles, with or without a narrow body, most consumers have not chosen such offerings, as they have lacked some or all of the mass market vehicle consumer requirements: familiar feel and controls, ability to operate on all roads, capacity for a second passenger and a minimum level of reliability and perceived safety.

Examples in the prior art include narrow body vehicles proposed for increasing transportation efficiency by carrying one or more people in tandem seating. Such vehicles have three or more wheels to keep them upright when stopped. U.S. Pat. No. 4,484,648, U.S. Pat. No. 4,283,074 and U.S. Pat. No. 6,328,121 disclose narrow vehicles that utilize tilting mechanisms or ballast to provide stability when turning. Although these vehicles have significant aerodynamic and maneuverability benefits due to their small stature, their ultra-narrow form factors lead to an appearance of lack of stability. U.S. Pat. No. 5,806,622 and U.S. Pat. No. 5,960,901 disclose narrow three-wheeled vehicles designed to carry one passenger, driven from the rear wheel. The inability to carry a second passenger and rear-drive traction concerns limit the widespread adoption of such vehicles. U.S. Pat. No. 6,328,121 teaches of the importance of a high rollover threshold for ultra narrow automobiles and the importance of low center of gravity in establishing a high rollover threshold.

All of the prior art vehicles suffer from an appearance of instability or a lack of familiar feel, safety or comfort such that none has been widely adopted.

BRIEF SUMMARY

The foregoing objects are achieved by providing a vehicle platform comprised of a vehicle chassis supported by three wheels, one on each side of the vehicle mounted with their axis perpendicular to the long axis of the vehicle near the front, and one wheel centered near the rear of the vehicle, a propulsion system, an automotive class steering mechanism to provide steering from the two front wheels, an operators seat centered above the long axis of the vehicle, and optionally a second seat positioned directly to the rear of the operators seat. The vehicle components are arranged to provide an optimal low center of gravity and good handling and drive characteristics. The propulsion system is preferably comprised of an electric motor positioned near the base plane of the vehicle and a portion of the mass of which is below the deck height of the vehicle, forward of the power transmission mechanism, and powered by an energy storage device which is preferably a battery. The power transmission mechanism is preferably a speed reduction and differential with dual output drive suitable for two wheel front drive. The energy storage device is positioned near the base plane of the vehicle behind the power transmission mechanism, and its center of mass is below the deck height of the vehicle. The storage device is preferably of a maximum height less than 8 inches such that vehicle deck height and consequently the interior cabin floor and operator seat are kept low to the ground. The operator seat may be narrower in parts than a conventional automotive seat such that the rear seat passenger's knees can comfortably straddle the operator seat to allow the distance between the two occupants to be less than a typical automobile. The storage device may not occupy the full volume under the vehicle deck in order that the driver's and passenger's heels can comfortably fit into recessed wells, thus allowing the driver's and passenger's center of gravity to be lower, while still maintaining a comfortable sitting position.

Some advantages of the present disclosure include one or more of the following:

to be significantly narrower in body and narrower in track width than a conventional automobile for improved maneuverability in heavy traffic and urban environments, easier parking and improved aerodynamic efficiency;

to have automotive class stability, feel and traction despite its narrow form and footprint on the road;

to be fast enough for freeway travel;

to provide a significantly higher level of operator safety than motorcycle class vehicles;

to be less expensive to build and operate than a conventional automobile; and to be a practical and thus commercially viable alternative to conventional automobiles

BRIEF DESCRIPTION OF THE SEVERAL DRAWINGS

DETAILED DESCRIPTION

FIGS. 1-3

Figure 1:
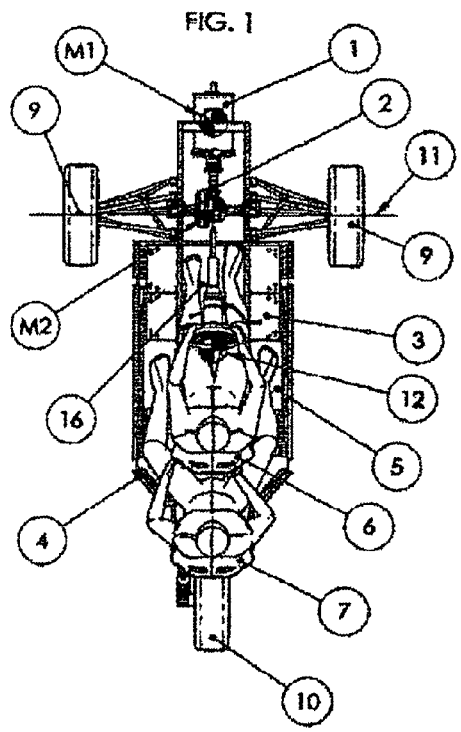
FIG. 1 is a top view of the ultra efficient vehicle platform utilizing a motor whose axis of rotation is perpendicular to the output shafts of the transmission mechanism.
Figure 2:
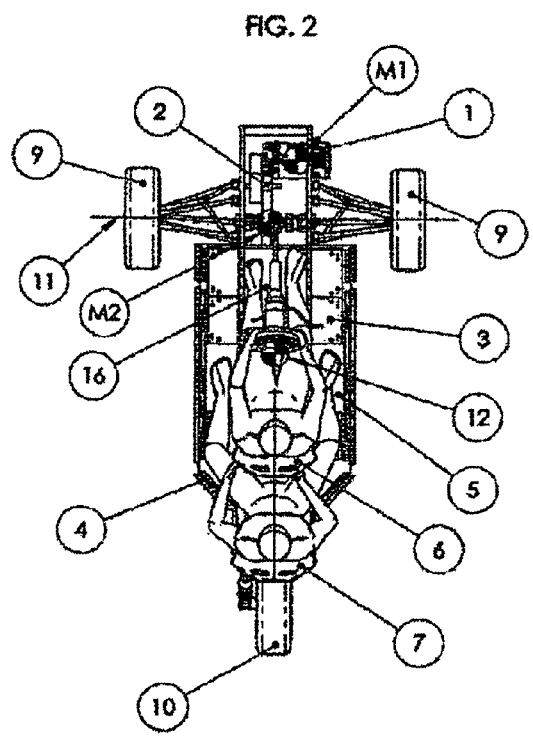
FIG. 2 is a top view of the ultra efficient vehicle platform utilizing a motor whose axis of rotation is parallel to the output shafts of the transmission mechanism.

Two embodiments of the vehicle platform are shown in FIGS. 1 and 2, showing the common elements of the platform as well as two variations in power transmission mechanism and motor rotation axis. The vehicle platform includes a chassis 4 for support of the propulsion system, occupants and body. Operator seat 6 and passenger seat 7 are positioned such that the passenger seat is directly behind the operator seat. Alternatively the passenger seat may not be provided so as to add more storage capacity to the vehicle. The operator and passenger seats are positioned closer together than the front and rear seats of a conventional automobile in order to provide a smaller vehicle footprint on the road. The operator seat may be narrower in parts than a conventional automotive seat to allow the passenger's legs to comfortably straddle the operator seat. A foot well 16 within the forward center area of the energy storage device 3 allows for comfortable driver foot placement while lowering the driver seat. Foot wells 5 toward the rear of the energy storage device 3 allow for comfortable passenger foot placement while lowering the passenger seat. A floor deck 17 formed of sheet material, such as corrugated plastic or other suitable material, can be provided over the upper surface of the energy storage device 3.

Two front wheels 9 positioned near the front of the vehicle are driven by a propulsion system which is preferably an electric motor 1 powered by an energy storage device 3 and connected to a power transmission mechanism 2 to distribute power to the front wheels. The energy storage device is preferably a series of battery modules. Alternatively, other suitable energy storage devices may be used, such as a fuel cell. One rear wheel 10 is positioned along the long axis near the rear of the vehicle. The components of the propulsion system are arranged so as to provide ballast for stability on the three wheeled platform; the motor center of mass M1 is positioned in front of the center of mass of the transmission mechanism M2 and low to the ground such that some portion of its mass is below the floor deck height 13, and the energy storage device is positioned low towards the bottom surface of the vehicle 14 such that its center of mass M3 is below the deck height 13 and as far forward in the vehicle as possible while still behind the front axle center line 11. As one example, at least 25% of the weight of the motor 1 may be positioned at a level below the deck height 13. As another example, a majority of the energy storage device 3 may be positioned below the deck height 13. In the longitudinal direction, the energy storage device in some embodiments is positioned in the forward-most 60% of the vehicle.

Dead weight ballast may be added near the motor and energy storage device if they are not heavy enough to provide vehicle stability in hard turns. The high proportion of mass forward and low result in an optimally positioned center of gravity 12 which combined with drive and steering from the front wheels yield an automotive class feel to the narrow body three wheeled vehicle.

In some embodiments, the ground clearance, i.e., the distance between the bottom surface 14 and ground level, is in the range of about 5 inches to about 8 inches, and is preferably approximately 6 inches. In some embodiments, the floor deck has a vertical dimension of about 6 inches to about 10 inches above the bottom surface 14.

Figure 3:
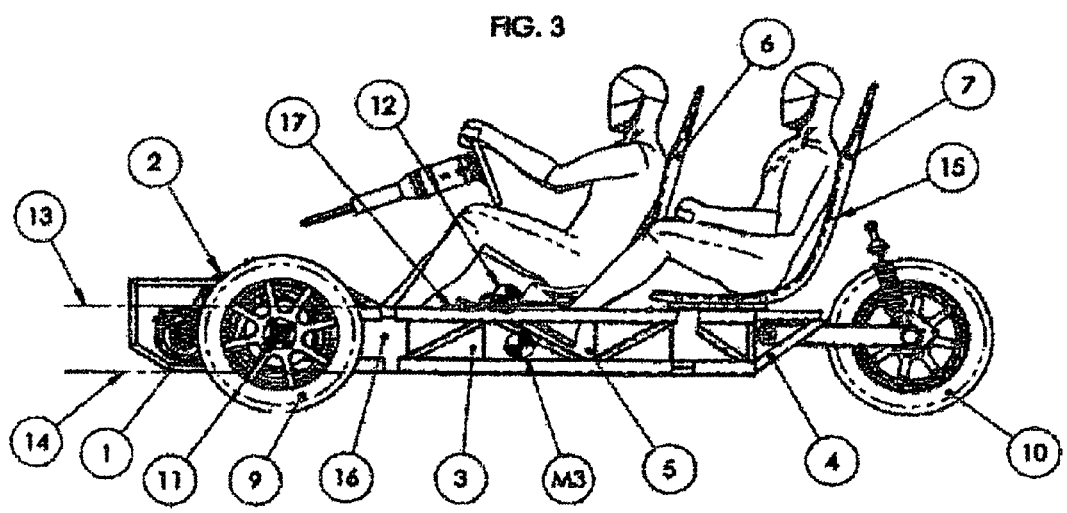
FIG. 3 is a side view of the ultra efficient vehicle platform.
Figure 4:
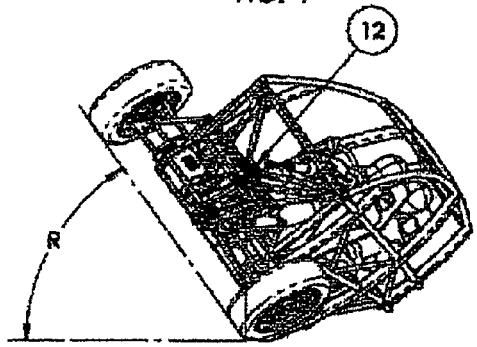
FIG. 4 is an angled front view of the vehicle platform tilted to its rollover threshold angle.

Referring to FIG. 3, the passenger seat 7 may be hinged along its back, such as at a point 15, to allow a top portion to be folded, e.g., to provide for storage in the vehicle. As an example, the electric motor may be a 83 peak HP series-wound DC motor from Advanced Motors and Drives of New York, the energy storage device may be lead acid batteries weighing about 600 lb and the transmission mechanism may be a two-stage synchronous belt system driving a differential with outputs to each front wheel. With a curb weight of about 1500 lb, the present ultra efficient vehicle is estimated to achieve a range of about 40 miles per charge, a top speed of about 65 m.p.h. and and a 0-60 m.p.h. acceleration of less than 10 seconds. Such performance is equivalent to that of a good sedan.

FIG. 4

The ultra efficient vehicle must have excellent stability in turns to match the experience and safety of a conventional automobile. In this vehicle it is particularly desirable that the propulsion system is heavy enough, low enough and forward enough to move the vehicle's center of mass down and forward such that the rollover threshold R preferably exceeds 50 degrees from horizontal. That is, the present vehicle will always right itself onto its wheels as long as it is titled less than the rollover threshold. In comparison, some conventional sport utility automobiles have a rollover threshold as low as about 38 degrees.

FIGS. 5-6

Figure 5:
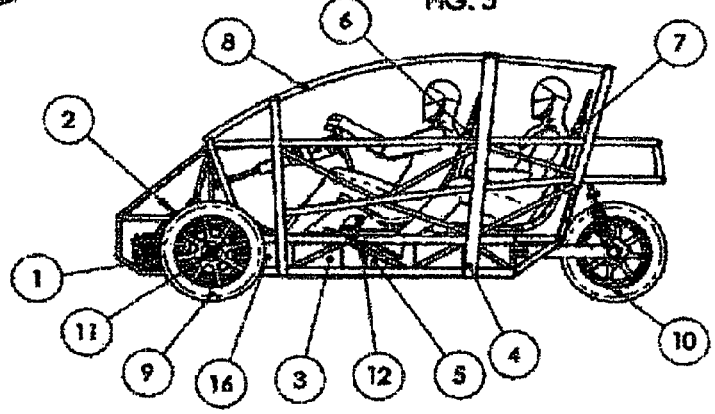
FIGS. 5 and 6 are a side and isometric view of a preferred embodiment of the vehicle showing the vehicle platform and safety cage.
Figure 6:
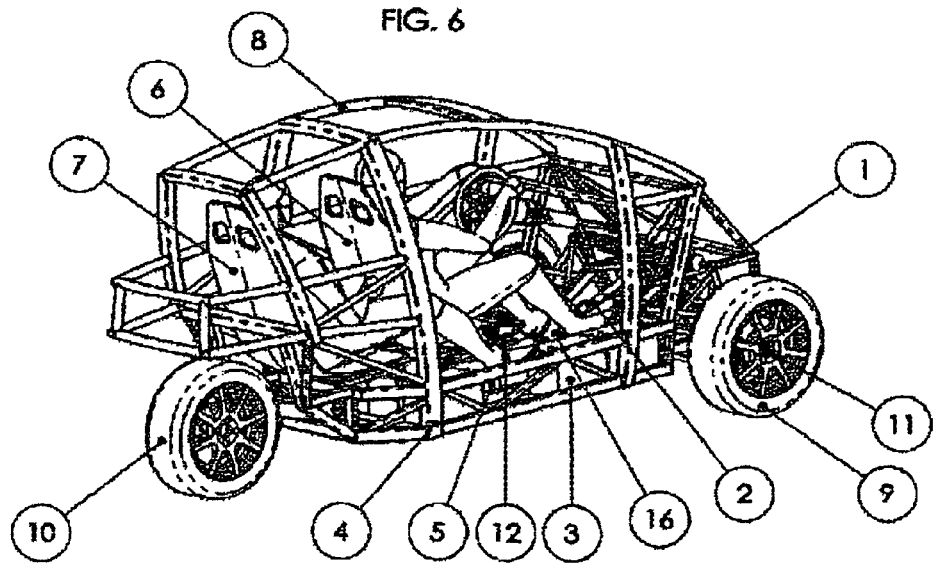

A preferred embodiment of the vehicle is shown in side and isometric view in FIGS. 5 and 6 respectively. It includes a chassis 4 with a frame 8 for providing safety. Alternatively, frame 8 can be augmented with body paneling for added comfort or can be replaced with a body providing both comfort and safety.

Thus the present vehicle relies on optimal placement of heavy components of the propulsion system and occupants on three wheels to provide stability in a narrow-body form. Unlike some of the prior art, the present vehicle does not use any device for leaning into the inside of a turn, so instead it leans to the outside of a turn like a conventional automobile. Therefore it can use standard, tested automotive components, increasing reliability and also providing familiar handling and traction to people who are accustomed to the operation of conventional automobiles.

FIG. 7

Figure 7:
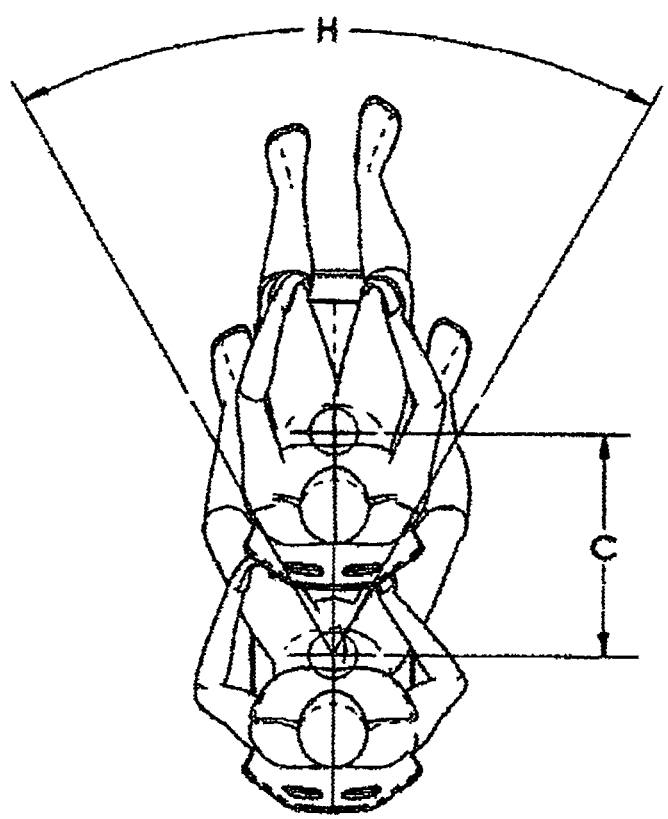
FIG. 7 is a top view of the passenger layout in the vehicle showing the close positioning of passengers and comfortable leg spread angle for the rear seat passenger.

A preferred embodiment of the occupant seating is shown in top view in FIG. 7. The front seat is constructed to be narrower where it overlaps the knees of the rear seat passenger to allow the feet and knees of the rear occupant to comfortably straddle the front seat when the two seats are close together. This arrangement allows the two occupants to sit closer together than a typical automobile. In this embodiment, the couple C (longitudinal distance between the hip pivot points of the two occupants) can be reduced to a value of 28 to 21 inches while maintaining acceptable rear occupant comfort by keeping the angle H less than 60 degrees. A typical automobile has a couple C of greater than 29 inches.

SUMMARY AND SCOPE

Accordingly, an ultra efficient vehicle is provided. It is significantly narrower in body and narrower in track width than a conventional automobile for improved maneuverability in heavy traffic and urban environments, easier parking and improved aerodynamic efficiency. Despite its narrow track width and lack of body tilting it is as stable as a conventional wide-body automobile. It provides familiar feel and traction to drivers accustomed to conventional automobiles despite its narrow form and three wheeled footprint on the road. It is as fast as a conventional sedan. Its stability on the road and ability to accommodate a safety frame provide a significantly higher level of operator safety than motorcycle class vehicles. The removal of mass elements and a wheel, while utilizing standard automotive transmission components, cause it to be less expensive to build and operate than a conventional automobile. It is thus a practical and commercially viable alternative to conventional automobiles.

Although the above description is specific, it should not be considered as a limitation on the scope of the invention, but only as an example of the preferred embodiment. Many variations are possible within the teachings of the invention. Therefore, the scope of the invention should be determined by the amended claims and their legal equivalents, not by the examples given.

We claim:

1. A three-wheeled vehicle comprising:
a chassis for supporting of vehicle components;
three wheels coupled to the chassis, two of said three wheels being front wheels, and one of said three wheels being a rear wheel;
a floor deck mounted to the chassis for covering an energy storage device providing locations for resting of a driver's and passenger's feet when in the vehicle;
a motor coupled to the chassis, wherein at least 25% of the mass of the motor is positioned below the level of the floor deck;
the energy storage device coupled to the motor for driving the motor;
a transmission used to transmit rotational energy from the motor to at least the two front wheels.

2. The three-wheeled vehicle of claim 1, wherein the three-wheeled vehicle includes a front end and a rear end defining a longitudinal axis therebetween and wherein the entire motor is positioned between the front end and the center of mass of the transmission.

3. The three-wheeled vehicle of claim 2, wherein the center of mass of the transmission is positioned between the motor and the energy storage device.

4. The three-wheeled vehicle of claim 1, wherein two single-passenger seats are mounted to the chassis in tandem along a longitudinal axis of the vehicle; one of the seats being a driver's seat and the other being a passenger seat.

5. The three-wheeled vehicle of claim 4, further including a footwell positioned below the floor deck for accommodating feet of a person in the driver seat.

6. The three-wheeled vehicle of claim 4, further including footwells positioned below the floor deck for accommodating feet of a person in the passenger seat.

7. The three-wheeled vehicle of claim 1, wherein the floor deck is positioned lower than an uppermost point on any of the three wheels.

8. The three-wheeled vehicle of claim 1, wherein the center of mass of the energy storage device is positioned below the floor deck.

9. The three-wheeled vehicle of claim 1, wherein a center of mass of the transmission is positioned below the floor deck.

10. A three-wheeled vehicle, comprising:
a chassis having a front end and a rear end defining a longitudinal axis of the vehicle;
three wheels coupled to the chassis, two of said three wheels being front wheels, and one of said three wheels being a rear wheel;
a transmission for transmitting rotational energy to the front wheels;
a motor, the center of mass of which is positioned between the center of mass of the transmission and the front end of the vehicle along the longitudinal axis of the vehicle;
a battery, the center of mass of which is positioned between the transmission and the rear end of the vehicle along the longitudinal axis of the vehicle;
two single-passenger seats, mounted to the chassis in tandem along a longitudinal axis of the vehicle, one of the seats being a driver's seat and the other being a passenger seat;
and a floor deck positioned vertically between the center of mass of the battery and the center of mass of the seats.

11. The three-wheeled vehicle of claim 10, further including a bottom surface of the vehicle, wherein the transmission, motor and battery are spaced along the longitudinal axis so that the center of mass of each is as dose as practicable to the bottom surface.

12. The three-wheeled vehicle of claim 10, wherein the center of mass of the motor is positioned below the level of the floor deck.

13. The three-wheeled vehicle of claim 10, with a footwell depressed below a level of the floor deck for resting a driver's feet while driving.

14. The three-wheeled vehicle of claim 10, further including footwells positioned below a level of the floor deck for resting the passenger's feet on either side of the front seat.

15. The three-wheeled vehicle of claim 10, wherein a center of gravity of each of the transmission, motor, and battery are positioned as close as practicable to the longitudinal axis.

16. The three-wheeled vehicle of claim 10 wherein the longitudinal distance between the front of the seat backs at any given elevation can be less than 28 inches.

* * * * *